US008818933B2

(12) United States Patent
Yemparala et al.

(10) Patent No.: US 8,818,933 B2
(45) Date of Patent: Aug. 26, 2014

(54) LIVE DASHBOARD (75) Inventors: Krishna Prasad Yemparala, Irving, TX (US); Ramanujam Achan, Irving, TX (US); Sunil Avadhanam, Irving, TX (US); Madhu Chapati, Irving, TX (US); Ravi Kalavagunta, Irving, TX (US); Andrzej Szymanski, Holiday, FL (US); Vivek Gurumurthy, Irving, TX (US); Sudharsan Velamur Srinivasan, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 59 days.

(21) Appl. No.: 13/177,280

(22) Filed: Jul. 6, 2011

(65) Prior Publication Data

US 2013/0013630 A1    Jan. 10, 2013

(51) Int. Cl.
G06F 7/00 (2006.01)
G06F 17/00 (2006.01)

(52) U.S. Cl.
USPC ............................. 707/603; 707/607

(58) Field of Classification Search
USPC ................................................. 707/603, 607
See application file for complete search history.

(56) References Cited

U.S. PATENT DOCUMENTS

| 7,899,900 B1* | 3/2011 | Motoyama ................... 709/224 |
|---|---|---|
| 2001/0039562 A1* | 11/2001 | Sato ............................... 709/202 |
| 2006/0089939 A1* | 4/2006 | Broda et al. ................... 707/100 |
| 2008/0086776 A1* | 4/2008 | Tuvell et al. ................... 726/24 |
| 2008/0163066 A1* | 7/2008 | Gu et al. ........................ 715/738 |
| 2010/0138295 A1* | 6/2010 | Caron et al. ................ 705/14.49 |
| 2010/0305987 A1* | 12/2010 | Correll et al. ...................... 705/7 |
| 2011/0225525 A1* | 9/2011 | Chasman et al. ............. 715/763 |
| 2012/0069131 A1* | 3/2012 | Abelow ...................... 348/14.01 |

* cited by examiner

*Primary Examiner* — James E Richardson (57) ABSTRACT

A computing device receives a request for data, the request including criteria for data requested to be provided to the client device. Via a service configured to retrieve the requested data, at least some of the criteria are transmitted to a staging data store that includes transactional data. Via the service, data relevant to at least some of the criteria transmitted to the staging data store is received from the staging database. The data received from the staging database is stored in a data structure included in the computing device. At least some of the data stored in the data structure is transmitted to a client device.

18 Claims, 6 Drawing Sheets

LIVE DASHBOARD

BACKGROUND INFORMATION

A database that records data from business transactions and other activities may be referred to as a transactional database. Often, transactional databases are populated on a real-time or substantially real-time basis. For example, when a transaction is completed, such as a customer ordering goods and/or services, information about the transaction may be recorded. Similarly, when action related to a customer is undertaken, such as provisioning a service, canceling a service, modifying a service, repairing equipment used to provide a service, etc., a transactional database may be updated. Information in a transactional database may accordingly be useful to managers of a business seeking to view metrics related to the business, identify trends, etc. However, transactional databases are generally not designed to provide reports. Further, providing access to a transactional database for reporting purposes can be risky from the standpoint of jeopardizing the database's transactional operations.

DETAILED DESCRIPTION OF PREFERRED EMBODIMENTS

Figure 1:
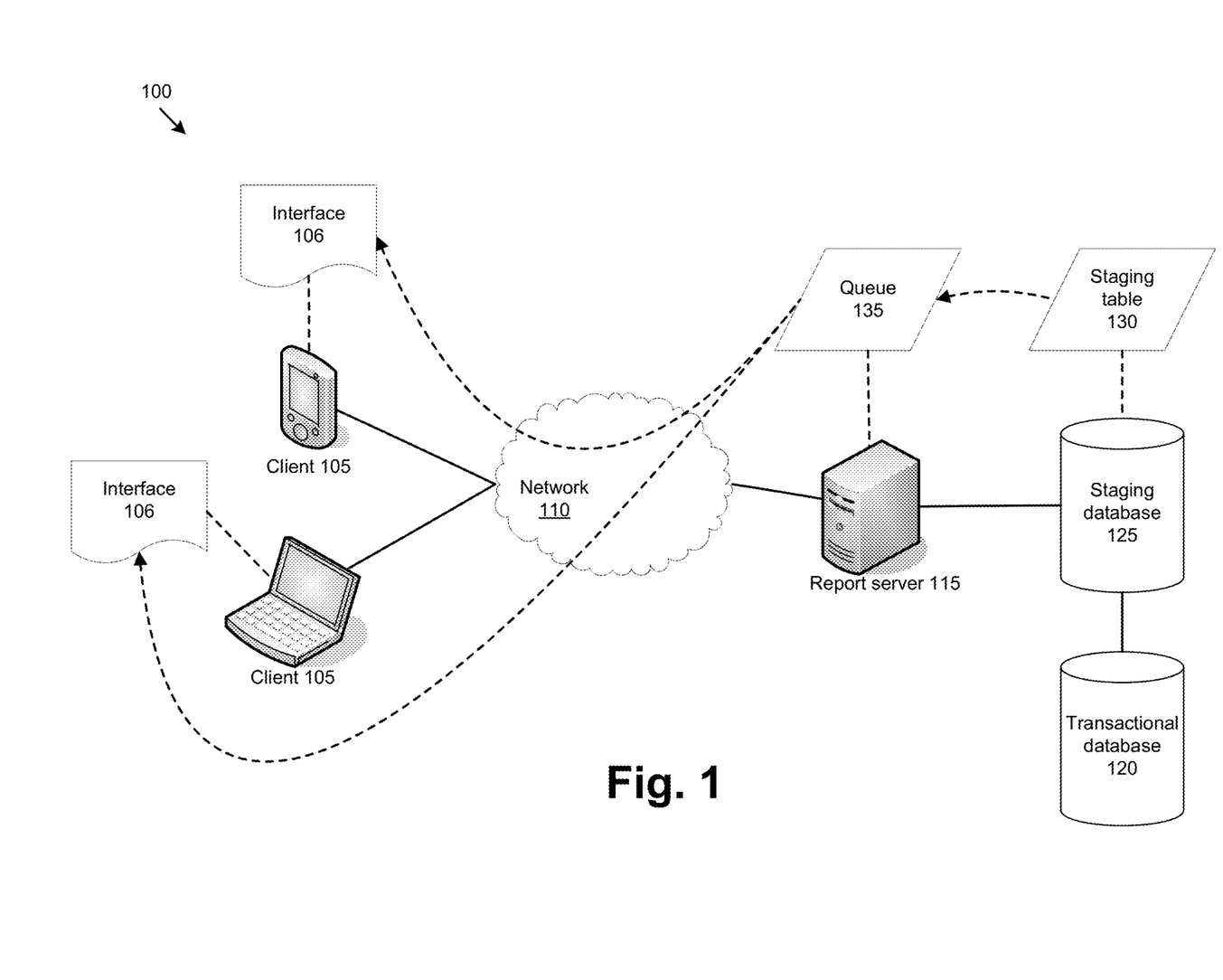
FIG. 1 illustrates an exemplary data gathering and reporting system.

As illustrated in FIG. 1, a data gathering and reporting system 100 generally includes one or more client computing devices 105. An interface 106 may be used for a client device 105 to display various data elements in various formats. The client devices 105 may communicate, generally via a network 110, with a reporting server 115. Data for display and interface 106 is generally provided from a transactional database 120. A staging database 125 generally includes a staging table 130 for retrieving and/or receiving data from the transactional database 120. Staging database 125 is generally communicatively coupled to reporting server 115, and may transfer, e.g., push, data from staging table 130 to a live data queue 135 that is stored in a memory of the reporting server 115. Data from the queue 135 may be provided to an interface 106 on a client device 105.

A client computing device 105 may be a single computing device, or one or multiple computing devices, having a processor for executing computer-executable instructions, and a memory and/or other computer readable media for storing data and computer-executable instructions. For example, client device 105 may be a smart phone, personal digital assistant, laptop computer, desktop computer, tablet computer, etc. Instructions included in computing device 105 may include instructions for displaying data, e.g., in the form of reports, and the interface 106. Further, such instructions, e.g., as may be included in a client reporting application stored in client 105, may include instructions for requesting data, e.g., reports, and for otherwise communicating with the reporting server 115.

Interface 106 is generally a graphical user interface (GUI) displayed on a screen of a client device 105. Interface 106 may include data in one or more of a variety of formats, such as a tabular format, various graphical formats such as bar graphs, line graphs, etc. In general, interface 106 is used to display reports or a dashboard, i.e., a collection of reports generally related in some way, on a screen of a client device 105. Further, reports, a dashboard, or other data, included in interface 106 may be updated on a real-time or substantially real-time basis. Examples of displays that may be included in interface 106 are provided in FIGS. 2 and 3, discussed further below.

Network 110 is generally a packet network such as an internet protocol (IP) network. As such, network 110 generally uses one or more known protocols for transporting data, such as user datagram protocol (UDP), transport control protocol (TCP), hypertext transfer protocol (HTTP), etc. Further, network 110 may include a variety of networks such as a wide area network (WAN), e.g., the Internet, a local area network (LAN), etc.

Reporting server 115 may be one or more computing devices, each having a processor for executing computer-executable instructions, and a memory and/or other computer readable media for storing data and computer-executable instructions. Instructions included on reporting server 115 generally include instructions for retrieving and/or receiving data from staging database 125, e.g., staging table 130, and providing data to interface 106. For example, such data may be retrieved and stored in live data queue 135, which may be maintained in a memory of reporting server 115 according to further instructions included on reporting server 115. In general, instructions on server 115 may be included in a software application such as the exemplary "Dashboard" application described further below.

Transactional database 120 generally includes relational database management system (RDBMS) software running on a computing device. Data included in transactional database 120 generally includes data that is stored related to various transactions. Thus, transactional database 120 is generally populated on a real-time or substantially real-time basis by applications used for conducting various transactions, e.g., sales transactions, ordering transactions, provisioning transactions, servicing transactions, etc. For example, transactional database 120 may include data related to provisioning and billing system for telecommunications services. Accordingly, when a service is ordered, provisioned, canceled, the subject of a service call, etc., such action may be recorded in transactional database 120. Similarly, when a bill for a service is incurred, paid, past due, etc., such action may likewise be recorded in transactional database 120. Thus, records pertaining to various attributes of various services may be stored in transactional database 120.

Data in transactional database 120 is generally stored on a real-time or substantially real-time basis. For example, when a service is ordered, e.g., telephonically via a customer service representative, or electronically via a web site, the order is generally recorded in transactional database 120 at the time, or substantially at the time, when the order is placed. Although not shown in FIG. 1, various business systems may communicate with transactional database 120 to store data in transactional database 120. For example, such business systems could include order entry systems, provisioning systems, billing systems, etc.

Transactional database 120 is generally in communication with staging database 125, e.g., through a local area network (LAN) or some other network such as network 110. Like transactional database 120, staging database 125 generally includes RDBMS (relational database management system) software running on a computing device. Staging database 125 may be a database instance on a computing device that also houses transactional database 120, or staging database 125 may be included in a different RDBMS system, and may be included on a different computing device. Although staging database 125 could be included in the same database instance as transactional database 120, such an arrangement could present risks to transactional database 120 that may be avoided by placing staging database 125 in a separate environment.

Staging database 125 may include one or more staging tables 130. A staging table 130 includes data to be provided to live data queue 135. An event trigger, e.g., a process that runs periodically, e.g., every 10 seconds, every minute, etc., included in database 125 retrieves specified data from transactional database 120 to populate a staging table 130 on a real-time or substantially real-time basis. Generally, a staging table 130 is populated with data of interest for display in a report or dashboard in the interface 106.

Live data queue 135 may be stored in a memory of reporting server 115. As mentioned above, data queue 135 receives data from staging table 130, and provides the data for display in one or more reports, graphs, etc. in interface 106. In one implementation, data queue 135 is a queue data structure, although other data structures and/or mechanisms for storing data could be used, such as a list, table, etc. As indicated by the dotted lines connecting data queue 135 with interfaces 106 in FIG. 1, data from data queue 135 is transferred, generally via a network such as network 110, from data queue 135 to populate one or more reports in one or more interfaces 106.

Figure 2:
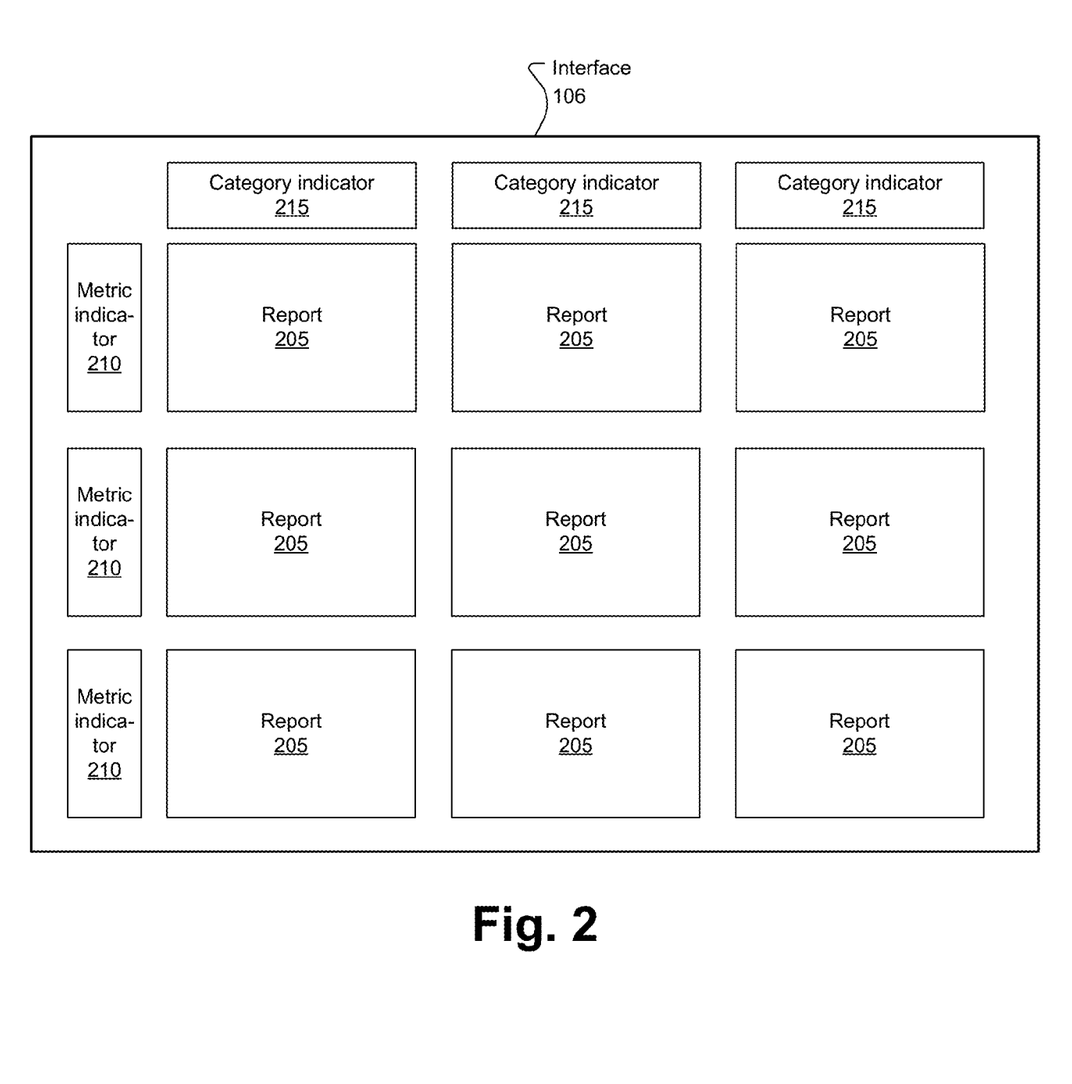
FIG. 2 illustrates an exemplary reporting interface.

FIG. 2 illustrates an exemplary interface 106. As seen in FIG. 2, the interface 106 may include a plurality of reports 205, e.g., arranged in a grid. Each row of reports 205 in the exemplary interface 106 of FIG. 2 is associated with a metric indicator 210. Each column of reports 205 in the exemplary interface 106 of FIG. 2 is associated with a subject category indicator 215. Metric indicator 210 generally indicates a business metric represented in a report 205.

Examples of business metrics that may be indicated by a metric indicator 210 include, without limitation, sales revenues, unit sales, a number of new customers, a number of customers lost (e.g., customers disconnecting telecommunication services), a number of customers presently subscribing to services in general, a number of customers presently subscribing to a particular service, etc. Examples of subject categories that may be indicated by a category indicator 215 include, without limitation, categories related to various services (e.g., voice, data, video, etc.), categories related to lines of business, customer categories (e.g., business, residential, etc.), geographical categories, etc.

By including multiple reports 205, each report at an intersection of one of a variety of metrics and one of a variety of categories, and by providing data for reports 205 on a real-time or substantially real-time basis, a live dashboard providing useful information related to a business may be provided in interface 106.

Figure 3:
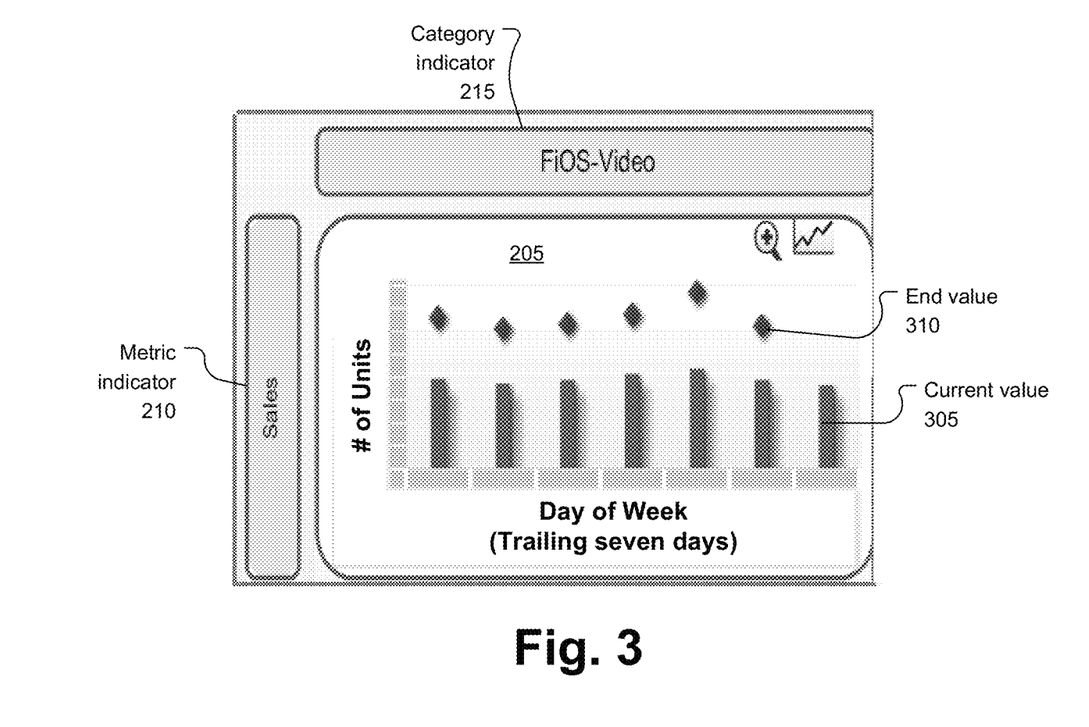
FIG. 3 illustrates an exemplary report.

FIG. 3 illustrates an exemplary report 205. This exemplary report 205 is presented in association with a metric indicator 210 that indicates that the report 205 provides sales data. Further, the report 205 is presented in association with a category indicator 215 that indicates that the report 205 provides data related to a video service. Although FIG. 3 shows a report 205 in graph form, is to be understood that a report 205 could include textual, e.g., a numeric, data in a tabular or some other format, a variety of graphs, a combination of graphical and textual data, etc.

The horizontal axis of the graph shown in the exemplary report 205 of FIG. 3 represents days of the week, while the vertical axis represents a number of units sold on each of the days. A current value 305 shows a current value, i.e., provides a datum, for each of the days in terms of a number of units sold, the current value generally reflecting a number of units sold up until approximately the time when the report 205 is displayed, or a time that is earlier, but not substantially earlier, then the time when the report 205 is displayed. An end value 310 represents a value, i.e., provides a datum, for a number of units sold at the end of each day being reported, except for the last day being reported because the last day being reported has not ended yet.

Figure 4:
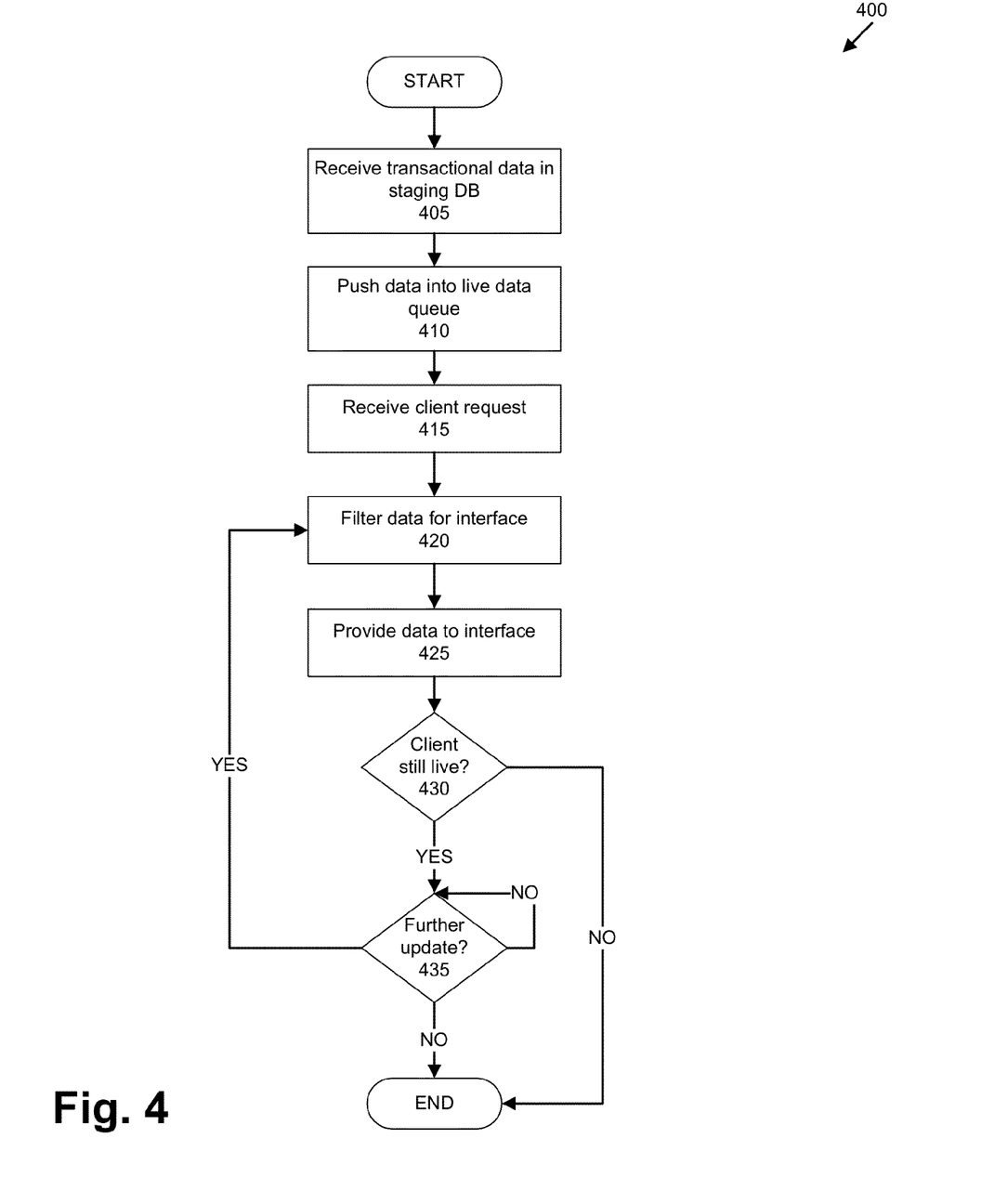
FIG. 4 illustrates an exemplary process by which data is provided to an interface.

FIG. 4 illustrates an exemplary process 400 by which data is provided to an interface 106.

The process 400 begins in a step 405, in which staging database 125 receives data from transactional database 120. As noted above, the transactional database 120 is generally populated on a real-time or substantially real-time basis by applications used for conducting various transactions. Staging database 125 may receive data from transactional database 120 according to a variety of mechanisms. For example, staging database 125 may to retrieve certain data from transactional database 120 at predetermined time intervals, and store such data in staging table 130. Similarly, transactional database 120 could include a stored procedure or other similar instructions to provide data at predetermined time intervals, upon certain fields in the database 120 being populated, etc., to staging database 125, which could then store the received data in staging table 130. In general, transactional database 120 is populated on a nearly constant or very frequent basis by one or more various applications processing business transactions. Accordingly, the system 100 is generally configured so that the staging database 125 receives data from the transactional database 120 on a real-time or substantially real-time basis, and various events, and various triggers based on the various events, could be used to trigger population of one or more staging tables 130 within the staging database 125.

Following step 405, in a step 410, staging database 125 pushes data from the staging table 130 to the live data queue 135 stored in reporting server 115. As discussed above, staging database 125 and reporting server 115 are generally separate physical environments, although they could be a single computing device. Further, reporting server 115 could be configured to retrieve data from staging table 130, e.g., according to predetermined time intervals, rather than staging database 125 pushing data to the live data queue 135 according to an event such as passage of a predetermined time interval, new data in one or more fields or categories being received in the staging table 130, etc.

Next, in a step 415, reporting server 115 receives a request from a client 105 to provide one or more reports 205 for display in interface 106. A request may be made in a variety of ways, and may identify various information to be included in reports 205 to be displayed in interface 106. For example, an application stored on a client 105 may include instructions for requesting a predetermined set, or "dashboard" of reports 205. In this example, the client 105 could be configured to provide a generic dashboard of reports representing a cross-section of relevant information to a business, or could be configured to provide a dashboard of particular reports 205 known to be of interest to the user of client 105. Further, client 105 could provide an identifier or the like to reporting server 115, such identifier being associated by reporting server 115 with a particular dashboard or set of reports 205 to be provided to the client 105 associated with the identifier.

Next, in a step 420, live data queue 135 pushes a set of data recently received from staging table 130 to a reporting module configured to filter data to be returned to client 105 according to the request received in step 415. For example, the client 105 may have requested a particular report or set of reports, or may have provided a request for a standard dashboard of reports 205. Further, data could be filtered according to geography, business categories, etc. Also, particular reports 205 relating to specific metric indicators 210 and/or category indicators 215 could be requested, and therefore the basis for filtering data in step 420.

Next, in a step 425, the reporting module in reporting server 115 returns requested data to the client 105, which displays the requested data in the interface 106, e.g., as a set of one or more reports 205, e.g., as shown in FIG. 2.

Next, in a step 430, reporting server 115 determines whether communications are still being received from the client device 105 from which a request was received as described above with respect to step 415. For example, the reporting server 115 may send a test communication requiring a response to the client 105, the client 105 could be configured to periodically send status messages to the reporting server 115, etc. In any event, if the reporting server 115 determines that the client 105 is not still in a "live" state, then the process 400 may end. Otherwise, step 435 may be executed next.

In step 435, reporting server 115 determines whether further data updates relevant to the request from client 105 have been received in live data queue 135. If so, process 400 returns to step 420. Otherwise, process 400 may continue to execute step 435, or, although not illustrated in FIG. 4, may end.

Generally, step 435 may be executed on a periodic basis, e.g., every 30 seconds, every minute, every three minutes, etc., so that data in reports 205 displayed in interface 106 will be updated on at least a substantially real-time basis. In general, steps 405 and 410 may be executed on a continuous or nearly continuous basis, regardless of whether a request has been received from a client device 105 for one or more reports. That is, although described herein as part of process 400, steps 405 and 410 generally execute independently of other steps in process 400. Accordingly, once a client device 105 does request one or more reports, e.g., as described with respect to step 415, the reporting server 115 may access or receive data from live data queue 135 on a real-time or substantially real-time basis to provide the data for reports 205 in interface 106.

Figure 5:
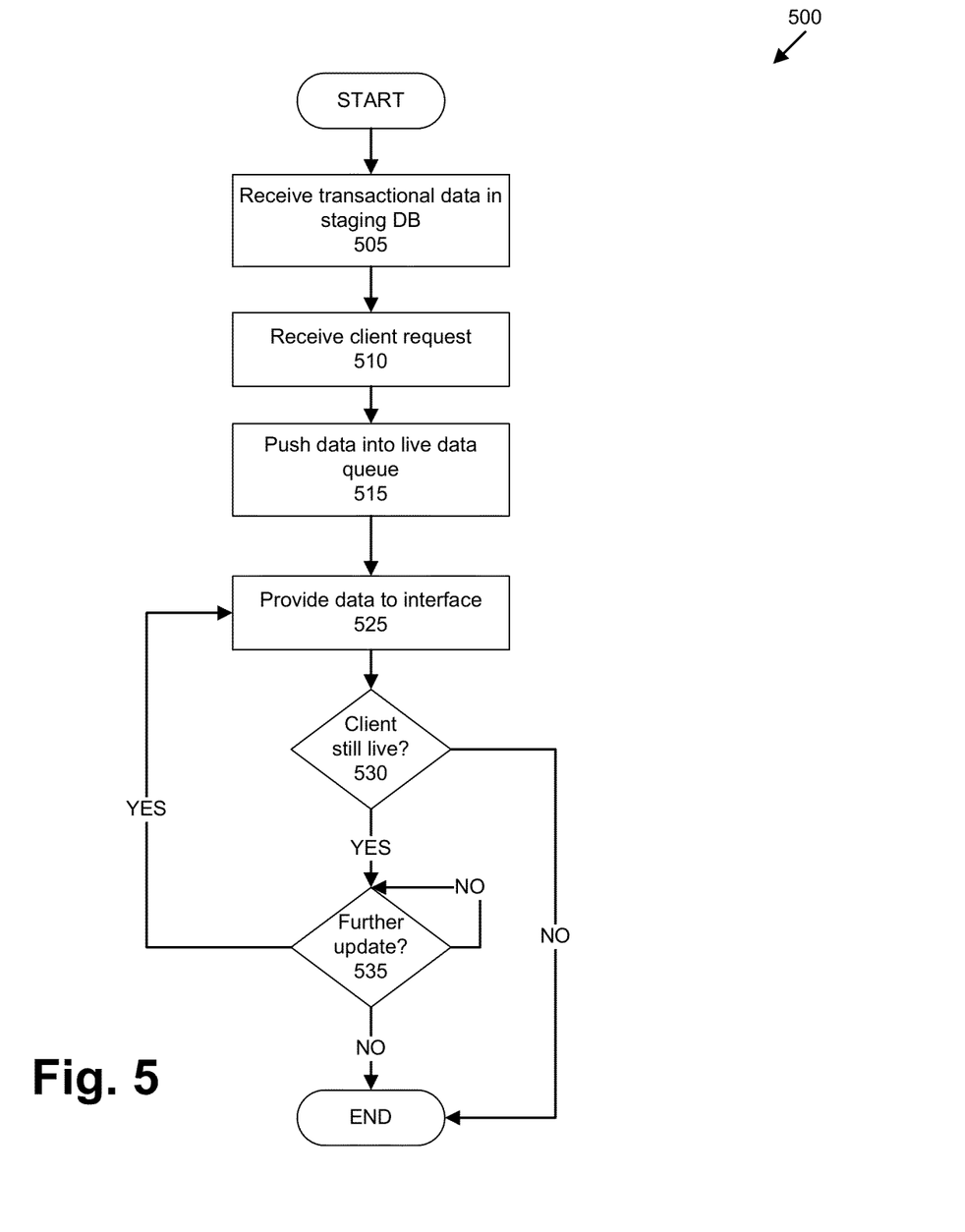
FIG. 5 illustrates another exemplary process by which data is provided to an interface.

FIG. 5 illustrates another exemplary process 500 by which data is provided to an interface 106.

The process 500 begins in a step 505, in which staging database 125 receives data from transactional database 120. Step 505 is similar to step 405 of process 400, described above.

Next, in a step 510, reporting server 115 receives a request from a client 105 to provide one or more reports 205 for display in interface 106. Step 510 is similar to step 415 of process 400, described above.

Next, in a step 515, live data queue 135 receives data according to the request of step 510. For example, a reporting module in reporting server 115 may be configured to periodically request information from staging table 130 for live data queue 135 according to a request received from a client 105. Alternatively, reporting server 115 could pass a request to database 125, which could include instructions to cause data relevant to a client 105 request to be periodically, e.g., on a frequent basis so as to provide substantially real-time information, provided to live data queue 135.

Next, in a step 525, the reporting module in reporting server 115 returns requested data to the client 105, which displays the requested data in the interface 106, e.g., as a set of one or more reports 205, e.g., as shown in FIG. 2.

Next, in a step 530, reporting server 115 determines whether communications are still being received from the client device 105 from which a request was received as described above with respect to step 415. Step 530 is similar to step 430 of process 400, described above. If the reporting server 115 determines that the client 105 is not still in a "live" state, then the process 500 may end. Otherwise, step 535 may be executed next.

In step 535, reporting server 115 determines whether further data updates relevant to the request from client 105 have been received in live data queue 135. If so, process 500 returns to step 520, so that reports 205 in interface 106 can be updated on a real-time or substantially real-time basis without a client device 105 making a further request for reports 205. Otherwise, process 500 may continue to execute step 535, or, although not illustrated in FIG. 5, may end.

Certain details of an exemplary implementation of the system 100 will now be described, e.g., details of a "Dashboard" application included on server 115, and also provided to client 105. In this exemplary implementation, the Cairngorm framework for application architecture is used to develop the Dashboard application using the Flex software development kit (SDK) provided by Adobe Systems Incorporated San Jose, Calif. The Cairngorm framework utilizes the known model-view-controller (MVC) architecture in which a controller is used to receive input via a user interface, and translate the input to a command transmitted to a model components, which may change its state, retrieve data, etc. upon receipt of the command. The model in turn may be used to update a view component that includes the user interface. Thus, in the MVC architecture, application-level logic in the model component is separated from presentation logic in the view component.

Accordingly, in general, the Dashboard application includes a controller module, a model module, and a view module, sometimes also referred to as a controller object or a controller layer, a model object or a model layer, and a view layer or a view object. The controller module is a singleton controller, meaning that only one instance of a controller class may be instantiated. A task of the controller is to bind events to commands. The controller receives every event generated by the view module, and dispatches events to the model module as commands according to an event's declared type. The controller layer may be implemented as an Adobe action script (AS) file. The model and view layers may also be implemented as AS files.

The main compiled application file of the Dashboard application for client 105, sometimes referred to as the front-end application, is a SWF (shockwave flash) file called Dashboard.swf. The Dashboard.swf file is loaded into a web browser of client 105 to generate interface 106. The exemplary Dashboard application also includes a file called dashboard_lib.swf, which includes the Cairngorm implementation of the Dashboard application in compiled form. Thus, this file includes core modules of the Dashboard application, including application-specific files as well as files related to the Cairngorm framework.

The main source code application file of the front-end application for the exemplary Dashboard application is an MXML file called dashboard.mxml. MXML is an extensible markup language (XML) format for laying out interfaces. The dashboard.mxml file includes a method called Init( ) that is the event handler for a creation completion event. That is, when creation of the dashboard.mxml file is completed, the Init( ) method is used to trigger the Cairngorm event loadConfigEvent, which causes configuration properties to be loaded into the model module from a config.xml file.

Dashboard.mxml is responsible for loading a file called HomePageModule.mxml, which essentially manages the view module of the Dashboard application. Methods included in HomePageModule.mxml are: an Init( ) method, and IconCreationHandler( ) and a handleBannerHeaderDataChange( ) method. Other files initially loaded by Dashboard.mxml, and discussed in more detail below, include HeaderModule.mxml, ChartModule.mxml, and SystemInstrumentation.mxml.

The Init( ) method included in HomePageModule.mxml dispatches a GetHomePageDetails event that causes the model module to be updated with information from a profile for a user for whom the interface 106 is being created, e.g., details about a user group to which the user may belong, and data from Cairngorm Value Objects (VOs) for the user group, e.g., icons that should be displayed in the interface 106 for users belonging to the user group or other information pertaining to the user group, etc. A Cairngorm Value Object is a structure used for storing data that will be accessed by a model module. When the GetHomePageDetails is triggered, a model.isCompleted variable, a Boolean variable sometimes referred to as a flag, is set to "true."

The IconCreationHandler( ) method included in HomePageModule.mxml is bound to the model.isCompleted variable. IconCreationHandler( ) method provides icons to the model according to data in icon VOs. Note that the icon VOs also provide URLs (uniform resource locators) specifying pages to be retrieved, e.g., the URLs to be associated with an onClickIcon event for each icon.

The handleBannerHeaderdataChange( ) method is invoked when a model.bannerInfo.bannerInfoArray value object, discussed further below with respect to the HeaderModule.mxml file, is modified, i.e., when changes are made in a banner header to be displayed in interface 106.

HeaderModule.mxml is a module loaded at the top of the page displayed in interface 106. This module is used to display metrics such as a count of life users of the system 100, a link for a user to log out of the system 100, and other icons providing links, e.g., to a homepage for system 100, to various reporting pages, etc. The model.bannerInfo.bannerInfoArray value object includes data specifying content for the banner.

ChartModule.mxml is used to load a display of one or more reports 205 into interface 106, possibly also with metric indicators 210 and/or category indicators 215. A GetAllDetailsEvent is triggered when this loading is complete. This event triggers retrieval of data for the reports 205, and updates the model layer accordingly. Because, in the MVC architecture, the model is bound to view components, when the model data is modified, view components are updated correspondingly.

ChartModule.mxml also includes a Timer timerComplete (event TimerEvent) method that is invoked when a TimerEvent is triggered. The TimerEvent is triggered at predetermined intervals, e.g., 30 seconds, five minutes, etc. The Timer timerComplete method in turn triggers the GetAllDetailsEvent.

ChartModule.mxml also includes a HandleScenarioChange( ) method that is invoked when input is received to select a change in a view presented via interface 106, e.g., a request to change a graph type for a report 205, a request to change a reporting time, etc.

SystemInstrumentation.mxml is used to load a display into interface 106 that includes statistics related to various elements of a business system. For example, reports 205 loaded by ChartModule.mxml may provide information about delivery of telecommunication services such as sales and marketing data, while reports 205 loaded by SystemInstrumentation.mxml may include information about the delivery of the telecommunication services such as statistics related to usage of and loads on servers and other hardware elements used to provide telecommunications services. Two methods included in SystemInstrumentation.mxml are InitApplication( ) and loadDataTimerHandler(event TimerEvent).

The InitApplication( ) method is invoked when a system instrumentation page load is complete. The InitApplication( ) method in turn triggers a GetSiDataEvent which is used to load data related to system instrumentation (SI) from staging table 130 to the model layer, which in turn updates the view layer.

The loadDataTimerHandler(event TimerEvent) method is invoked when a TimerEvent is triggered. The TimerEvent is triggered at predetermined intervals, e.g., 30 seconds, five minutes, etc. The loadDataTimerHandler method in turn triggers the GetSiDataEvent.

Turning now to files included in what is sometimes referred to as the back-end application of the Dashboard application, the following categories of files may be included: assets, business delegates, commands, delegates, data retrieval services, the controller (e.g., controller.as), events, the model (e.g., modelLocator.as), various utilities, and value objects. Such files may be included for both an "executive reports" page and a "system instrumentation" page. Code for various back-end operations described herein may be written using the Java programming language.

Assets include fonts and other resources, e.g., images, that may be used by the Dashboard application.

Business delegates are methods or procedures that fetch data in response to commands associated with various events, such as events described above.

Commands include commands associated with events such as the events discussed above, provided to business delegates to retrieve data. Further, commands include procedures for processing retrieve data and updating the model layer according to retrieved data. Commands, as that term is used in the context of the present exemplary Dashboard application, generally provide business logic and responding to events associated with business data.

A delegate is a procedure used by a command to select a data retrieval service. Data retrieval services locate and retrieve data from a back-and data store such as staging table 130 in database 125. Data retrieval services may access the database 125 through an adapter, e.g., a module that translates between a query from a service in a query format expected by the back-end data store, and likewise provides data from the back-end data store to the service.

As discussed above, the main task of the controller is to bind events with commands. In general, the controller intercepts dispatched events and forwards events to appropriate command instances for processing. That is, events dispatched by the view layer are handled by the controller.

Events include all custom events in the Dashboard application. Examples are the getAllDetailsEvent and the getSiDataEvent, discussed above. In general, custom events are used to transport or package data to a recipient, e.g., the view layer providing interface 106. Events have a unique or substantially unique identifier.

As discussed above, the model layer is a global singleton, i.e., only one instance of a model class exists at any one time, repository for shared or global data. Note that the model layer does not load or persist data to a permanent data store, and does not contain business logic. Instead, the model layer serves to provide caching and access for application data. Accordingly, the model layer supports binding data from staging table 130 to elements in reports 205 so that when data changes a view may be automatically updated. Simple data structures may be stored directly within the model layer. However, more complex data representations are stored in value objects which are then referenced in the model, and bound to view components.

Utilities included in the back-end application include methods that parse XML response files from database 125, and that instantiate value objects in the model layer related to parsed response data.

Value objects, as discussed above, are used to store data in the model layer. Value objects used by the Dashboard application may include BannerHeaderVO, ChartItemVO, ChartScenarioVO, ConfigVO, HeaderOrderVO, IconVO, LegendVO, and MarketingDataVO.

BannerHeaderVO is a value object that includes information about a page banner, such as one or more name-value pairs for information to be included in the banner, such as a title, message, etc.

ChartItemVO is a value object holding data belonging to an individual chart, i.e., report 205. Thus, the Dashboard application generally includes multiple instances of ChartItemVO, i.e., one for each report 205 included in interface 106. Attributes of the ChartItemVO may include a metric indicator 210 and/or a category indicator 215, in addition to an array containing chart values, a product name associated with the chart, linear and horizontal axis titles, a Boolean variable indicating whether the chart has been modified, a graph type indicator, a service type indicator related to a type of service associated with the chart, and a Boolean variable that is an indicator as to whether alerts related to the chart are to be provided.

ChartScenarioVO includes attributes specifying a view scenario selected for interface 105. A scenario includes comparing current record 205 data to other data, or to historical data. Accordingly, this value object may include a scenarioSelected attribute, e.g., a string value, that indicates what data is being compared, along with a scenario values attribute, which is an array holding the data being compared to, and possibly superimposed on, report 205 data.

ConfigVO is a value object that includes configuration information for rendering interface 106, such as whether elements of the interface 106 should blink, if so, how often, the width and height of the interface 106, the width and height of individual reports 205, URLs for links to pages in the Dashboard application, e.g., a homepage, an executive reports page, a system instrumentation page, etc. ConfigVO may also include a URL for a config.xml file that includes further configuration information.

HeaderOrderVO stores a layout of reports 205 for a page provided in interface 106. For example, attributes of this value object may include arrays specifying rows and columns of reports 205.

IconVO includes information about icons used in interface 106, e.g. in a homepage of the Dashboard application. Attributes of the IconVO may include an icon name, description, a URL from which the icon image may be loaded, a URL with which the icon may be associated, e.g., a URL loaded when the icon is clicked on or otherwise selected, and other attributes such as a string to be provided in interface 106 when a pointing device hovers over the icon.

LegendVO specifies a legend for a report 205, and may be included in an XML file used to provide data from database 125 to interface 106. Attributes of the LegendVO may include a string indicating a value for the legend, a string indicating a color for the legend text, a Boolean variable indicating whether the legend has been modified, tool tip labels for horizontal and vertical axes of a report 205, i.e., text to be provided when a mouse or other pointing device hovers over one of the axes, etc.

MarketingDataVO includes information about a column series included in a report 205. For example, MarketingDataVO may include a string of values to be included on a horizontal axis of a graphical report 205, or values to be included as column headers in a textual report 205, "tool tip" values as discussed above, color values for labels, etc.

Note that the back-end application may include multiple versions of the foregoing elements to support different possible front-and views. For instance, in the presently discussed exemplary implementation, commands, events, value objects, etc. for a system instrumentation page are provided in parallel with like elements for an executive reports page.

Figure 6:
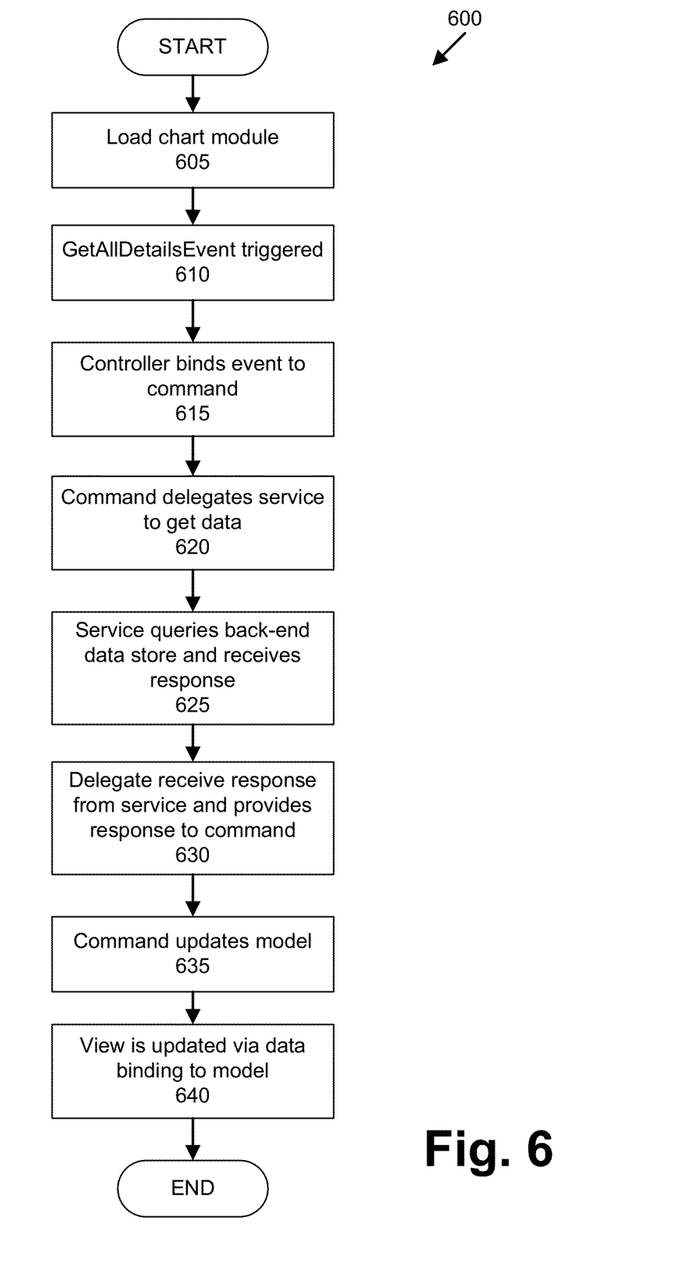
FIG. 6 illustrates an exemplary process for updating a model layer, and consequently a view layer, with data from a back-end data store.

FIG. 6 illustrates an exemplary process 600 for updating the model layer, and consequently the view layer, with data from a back-end data store such as database 125. More generally, FIG. 6 provides an illustration of how the model layer and the view layer interact, and how interface 106 may be populated.

The process 600 begins in a step 605, in which ChartModule.mxml is loaded into client 105.

Next, in step 610, a GetAllDetailsEvent is triggered, as described above.

Next, in step 615, the controller binds the GetAllDetailsEvent to a command.

Next, in step 620, the command requests a delegate to obtain data associated with the command, in this case, data required by the GetAllDetailsEvent, and the delegate assigns a service to obtain the requested data. In general, commands call delegates to make service calls, i.e., to retrieve data. An exception to this is a LoadConfigCommand associated with the LoadConfigEvent discussed above. The Load ConfigEvent loads an XML file, called config.xml as mentioned above, in this exemplary implementation by accessing a URL that is parsed to obtain configuration information upon initial loading of dashboard.mxml discussed above.

Next, in step 625, the service delegated in step 620 queries the back-end a data store, e.g., staging table 130, and obtains a response. In some cases, as discussed above, the response may be in the form of a value object.

Next, in step 630, the delegate assigned in step 620 receives the response obtained in step 625 from the service delegated in step 620, and provides the response to the command bound to the GetAllDetailsEvent.

Next, in step 635, the command updates the model layer.

Next, in step 640, the view layer is updated via its data binding to the model layer. For example, the command associated with the GetAllDetailsEvent would cause the model layer to be updated with data related to one or more reports 205, and the view layer would accordingly be updated so that the reports 205 would be populated or refreshed with data.

Following step 640, the process 600 ends.

Computing devices such as client device 105, reporting server 115, devices that include databases 120 and 125, etc. may employ any of a number of computer operating systems known to those skilled in the art, including, but by no means limited to, known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
receiving, in a computing device having a processor and a memory, a request for data, the request including criteria for data requested to be provided to a client device;
selecting a data retrieval service from a plurality of services configured to retrieve the requested data;
transmitting, via the selected service, at least some of the criteria to a staging database that includes transactional data;
receiving from the staging database, via the selected service, data relevant to at least some of the criteria transmitted to the staging database;
storing the data received from the staging database in a data structure included in the computing device; and
transmitting at least some of the data stored in the data structure to the client device, wherein the at least some of the data includes a plurality of metric indicators, a plurality of category indicators, and a plurality of arrays containing report values corresponding to respective reports;
receiving, in the client device, the data transmitted from the computing device, and displaying at least some of the data transmitted from the computing device into the respective reports;
arranging the respective reports along a first axis by the metric indicators and along a second axis by the category indicators in a grid on a display on the client device such that each report along the first axis of the grid shares a common category indicator from the category indicators, and each report along the second axis of the grid shares a common metric indicator from the metric indicators.

2. The method of claim 1, further comprising, without receiving a further request from the client device, storing additional data received from the staging database in the data structure, the additional data being relevant to at least some of the criteria transmitted to the staging database, and transmitting at least some of the further data to the client device.

3. The method of claim 1, wherein at least one of the respective reports includes a first datum that provides a value for a metric at a certain time of a day, and a second datum that provides a value for the metric at the end of the day.

4. The method of claim 1, further comprising receiving, in the staging database, the transactional data from a transactional database.

5. The method of claim 1, wherein the request is a command bound to a GetAllDetailsEvent.

6. The method of claim 1, further comprising:
loading, in the computing device a ChartModule file, thereby triggering a GetAllDetailsEvent;

binding the GetAllDetailsEvent to a command to retrieve specified data;

delegating, in the command, the data retrieval service;

querying for the data;

receiving from the data retrieval service a response to the query;

updating a model according to the command by at least updating a ChartItem value object that contains data relating to at least one report of the respective reports; and updating a view according to a binding of the view to the model.

7. The method of claim 6, wherein the model further includes a ChartScenario value object specifying a view scenario for presenting data in the updated view, the data including information about comparing a current record with historical data.

8. The method of claim 6, wherein the model further includes a MarketingData value object-storing one or more values to be included in the updated view about a column series.

9. The method of claim 1, further comprising a transactional database separate from the staging database, the staging database including a staging table receiving at least a subset of the data from the transactional database; and a model layer providing caching and supporting binding data from the staging table to elements in the reports.

10. A system comprising a client device, and a computing device having a processor and a memory, the memory having instructions executable by the processor tangibly stored thereon, the instructions including instructions for:

receiving a request for data, the request including criteria for data requested to be provided to the client device;

selecting a data retrieval service from a plurality of services configured to retrieve the requested data;

transmitting, via the selected service, at least some of the criteria to a staging database that includes transactional data;

receiving from the staging database, via the service, data relevant to at least some of the criteria transmitted to the staging database;

storing the data received from the staging database in a data structure included in the computing device; and transmitting at least some of the data stored in the data structure to the client device, wherein the at least some of the data includes a plurality of metric indicators, a plurality of category indicators, and a plurality of arrays containing report values corresponding to respective reports and configured in a manner to permit displaying at least some of the data transmitted from the computing device into the respective reports;

the client device having a processor and a memory, the memory having instructions executable by the processor tangibly stored thereon, the instructions including instructions for:

receiving, the data transmitted from the computing device, and displaying at least some of the data transmitted from the computing device into the respective reports;

arranging the respective reports along a first axis by the metric indicators and along a second axis by the category indicators in a grid on a display on the client device such that each report along the first axis of the grid shares a common category indicator from the category indicators, and each report along the second axis of the grid shares a common metric indicator from the metric indicators.

11. The system of claim 10, the instructions further including instructions for, without receiving a further request from the client device, storing additional data received from the staging database in the data structure, the additional data being relevant to at least some of the criteria transmitted to the staging database, and transmitting at least some of the further data to the client device.

12. The system of claim 11, the instructions further including instructions for receiving, in the client device, the additional data transmitted from the computing device, and displaying at least some of the additional data transmitted from the computing device in one report.

13. The system of claim 10, wherein the at least one report includes a first datum that provides a value for a metric at a certain time of a day, and a second datum that provides a value for the metric at the end of the day.

14. The system of claim 10, the instructions further including instructions for receiving, in the staging database, the transactional data from a transactional database.

15. The system of claim 10, wherein the request is a command bound to a GetAllDetailsEvent.

16. The system of claim 10, further including instructions for:

loading a ChartModule file, thereby triggering a GetAllDetailsEvent;

binding the GetAllDetailsEvent to a command to retrieve specified data;

delegating, in the command, the data retrieval service;

querying for the data;

receiving from the data retrieval service, in the command, a response to the query;

updating a model according to the command by at least updating a ChartItem value object that contains data relating to at least one report of the respective reports; and updating a view according to a binding of the view to the model.

17. The system of claim 16, wherein the model further includes a ChartScenario value object specifying a view scenario for presenting data in the updated view, the data including information about comparing a current record with historical data.

18. The system of claim 16, wherein the model further includes a MarketingData value object including one or more values to be included in the updated view about a column series.

* * * * *